Patented May 27, 1947

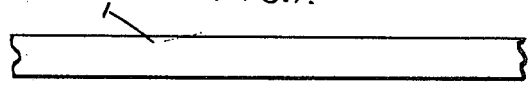
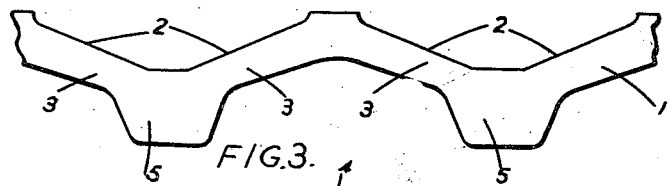
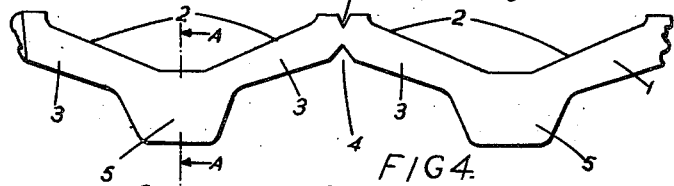
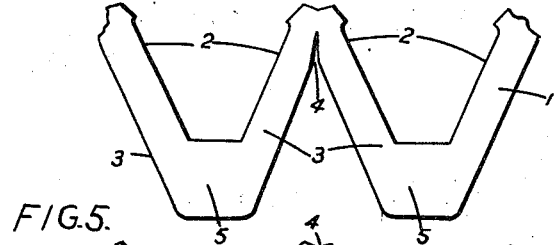
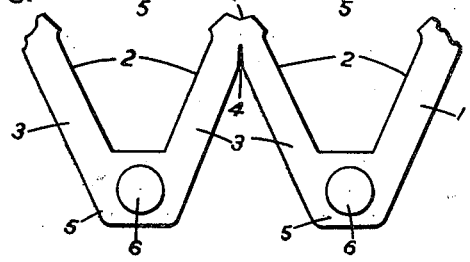
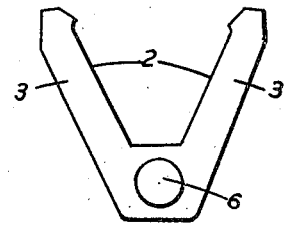

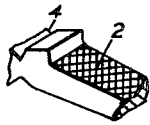
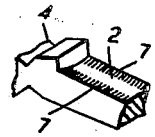
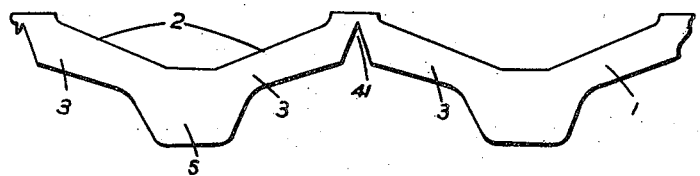
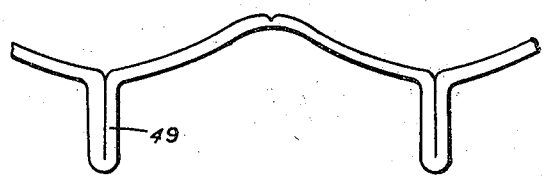
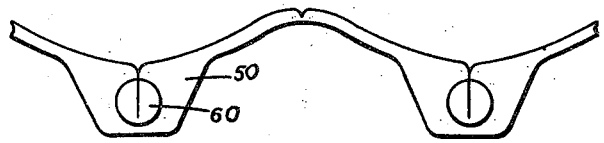

2,421,323

UNITED STATES PATENT OFFICE 2,421,323

MANUFACTURE OF SLIDING CLASP FASTENERS

Hermann Richard Fruengel, London, England, assignor to Zipp Fastener Company Limited, London, England, a company of Great Britain Application January 28, 1944, Serial No. 520,113
In Great Britain May 15, 1942

6 Claims. (Cl. 29—148)

The present invention relates to the manufacture of sliding clasp fasteners of the well known type in which fastener members are secured to two tapes or similar flexible supports to form stringers which are adapted to be brought into and out of interlocking engagement by a slider mounted on the stringers, and more particularly to a method of making the fastener members of sliding clasp fasteners.

It is an object of the invention, to enable the coupling elements of the members to be accurately positioned on the head portions of the members.

It is a further object of the invention, to provide members which are serrated, knurled, or otherwise roughened at the inner surfaces of the legs of the members, i. e. the surfaces adjacent the flexible support, so as to improve the seating of the members on the support, while the outer surfaces of the members are either smooth, or, alternatively, roughened to the same or a different degree to enable a lacquer or similar coating to adhere firmly on the members.

More broadly speaking, it is an object of the invention to give different surfaces, or parts of surfaces, of the members different degrees of roughness to suit the members best to a desired purpose.

Still another object of the invention is to provide fastener members the cross-sectional dimensions of the head portions of which are to a great degree independent of the cross-sectional dimensions of the legs of the members.

A still further object of the invention is to facilitate the manufacture of fastener members from wire.

A particular object of the invention is to facilitate the manufacture of fastener members from Celluloid, synthetic resinous or similar material, now commonly embraced by the term "plastic material."

These and other objects and advantages of the present invention will become apparent to those skilled in the art, from the sub-joined specification when taken in connexion with the accompanying drawings, in which:

Figs. 1 to 6 serve to illustrate successive steps of a method according to this invention;

Figs. 7 and 8 illustrate details;

Fig. 9 illustrates a first modification of the method illustrated in Figs. 1 to 8; and Figs. 10 and 11 illustrate a second modification of the method illustrated in Figs. 1 to 8.

Referring first to Figs. 1 to 6, a strip or wire 1 (Fig. 1) of metal or plastic material is pressed in a first step of the manufacture into a wavy shape as shown in Fig. 2 wherein crests are formed on opposite sides of the longitudinal axis, the crests on one side of such axis being treated to provide coupling elements, while the crests on the other side define the material which when treated provides the legs of adjacent fastener elements. If the wire or strip has a circular cross-section, it may simultaneously be deformed so as to assume a substantially rectangular cross-section. In the same or an additional step, those parts of the wire or strip which constitute eventually the inner surfaces 2 of the legs 3 of the members (Fig. 6) are serrated, knurled, or otherwise roughened, as indicated in Fig. 7. At the places where eventually the members are separated from each other small wedge-like indentations 4 are provided preferably at those crests on the side of the deformed wire or strip 1 opposite to that of the crests 5 carrying eventually the coupling projections 6 (Fig. 6), the wire or strip now assuming the shape shown in Fig. 3. As illustrated in Figs. 2 and 3 the parts forming the legs 3 are originally spread to a much greater degree than is required for attaching the members to the tape or the like, whereby the outer contour of the embryo members shows a wavy form. Subsequently, the legs of the embryo members while still interconnected are brought somewhat together as illustrated in Fig. 4, so that on the one hand they are still sufficiently spread for attachment to the tape, and on the other hand the outer contour of the legs is straight. By means of further rollers acting on the preformed wire or strip 1 in a direction perpendicular to that in which a first set acted and having along the circumference suitably arranged punches and dies, coupling projections 6 and corresponding coupling recesses (not shown) are formed in the members. The die may embrace the head parts 5 of the embryo members, whereby contrary to the commonly used known methods the coupling projections 6 and recesses may be accurately positioned on the heads 5 of the members. Finally, the members are severed from one another at the wedge-like indentations 4 to form separate members one of which is illustrated in Fig. 6. Each member may either be first attached on a tape and subsequently severed from the next succeeding one, or the members may first be severed from one another and subsequently attached to the tape in known manner. Since the outer surfaces of the members are smooth no additional treatment of the severed members is necessary. Instead of giving the legs 3 flat roughened inner surfaces 2, as illustrated in Fig. 7, the surfaces 2 may be made slightly concave as shown in Fig. 8, whereby the tape or the like can be firmly gripped by the edges 7 of the legs of the members.

The present invention has several advantages over the hitherto commonly used methods of making fastener members besides those already referred to. Since the cross-section of the wire or strip can be made rectangular and no interference with this shape takes place in the subsequent steps in the manufacture of fastener members, substantially the entire inner surfaces 2 (Fig. 7) of the legs are in engagement with the tapes or the like when the members are attached thereon, thus further ensuring a secure seating of the members on the tapes. When metal is punched the thickness of the punch should not be smaller than the thickness of the metal to be punched to avoid excessive wear on the punch. Therefore, when metal members are made in the hitherto usual manner, by punching, a necessary relationship exists between the thickness of the members and the width of the punch hole between their legs. With the present invention no such relationship exists and thus the dimensions of the members can be chosen more freely to suit the particular requirements in the best way. In particular, the thickness of the members may be increased without increasing the hole between their legs, whereby the seating of the members on the tapes may be improved.

According to a further feature of the invention, the wire or strip of material may be heated, if metal is used, to a temperature sufficient to soften or to re-soften the metal when it has become too hard during the pressing and forming processes, in order to enable the wire or strip to be easily shaped. Thereby it can be achieved that the embryo members do not break off prematurely at the indented parts.

Modifications of the method described are possible. For example, instead of making the outer surfaces of the members smooth, they may be roughened in a similar manner as explained above with regard to the surfaces 2 (Fig. 7), in order to lacquer the outer surfaces of the members, or to cover them, by means of an adhesive, with a layer of cotton flock, wool flock, or similar finely divided material of a desired colour. The roughened outer surfaces enable the covering layer to adhere more firmly to the members than would smooth surfaces.

While still connected, the members when made of metal may be plated electrochemically, or otherwise coloured, or similarly treated at their surfaces. For example, the members may be made of aluminium and coloured by anodization, an electric current being conducted through the connected members. In this way additional means hitherto used for enabling an electric current to flow through the members may be dispensed with.

If wire is used, the wire may be given a wavy shape as illustrated in Fig. 10, in which a part 49 of each crest is formed by a folded-back part of the wire which part is subsequently upset so as to assume the shape indicated at 50 in Fig. 11. On the part 50 subsequently the coupling elements 60 are provided in the manner described hereinbefore.

It should be clearly understood that the accompanying drawings are given by way of example and for explanatory purpose only. Many modifications, omissions and additions are possible without departing from the spirit of this invention.

I claim:

1. A method of making fastener elements for sliding clasp fasteners comprising the steps of deforming a continuous blank material extending linearly along a longitudinal axis, into a continuous longitudinally extending approximately wavy shape to form crests of waves interconnected by inclined portions of the material defining the legs of embryo fastener elements, the crests lying on one side of the said longitudinal axis of the material substantially defining the interconnected ends of contiguous legs, providing at least one indentation in each of said crests, providing the crests lying on the other side of said axis with coupling elements, and severing the crests defining the ends of the legs at said indentations.

2. A method of making fastener elements for sliding clasp fasteners comprising the steps of deforming a continuous strip of material extending linearly along the longitudinal axis, into a continuous longitudinally extending approximately wavy shape to form crests of waves interconnected by inclined portions of the strip, said inclined portions defining the legs of embryo fastener elements and the crests lying on one side of the said longitudinal axis of the strip defining the ends of contiguous legs, providing the crests lying on the other side of said axis with coupling elements, without any substantial deformation of the outer contour of said crests and severing the strip substantially at the centers of the crests defining the ends of the legs.

3. A method of making fastener elements for sliding clasp fasteners comprising the steps of deforming a continuous blank material extending linearly along a longitudinal axis, into a continuous longitudinally extending approximately wavy shape to form crests of waves interconnected by inclined portions of the material, said inclined portions defining the legs of embryo fastener elements and the crests lying on one side of the said longitudinal axis of the material defining the ends of contiguous legs, providing the crests of the waves lying on the other side of said axis with coupling elements while said crests are embraced at least at their outer surface to prevent any substantial deformation of the outer contour of said crests and to position accurately the coupling elements thereon, and severing the material substantially at the centers of the crests defining the ends of the legs.

4. A method of making fastener elements for slide clasp fasteners comprising the steps of pressing a continuous blank material extending linearly along a longitudinal axis, into a continuous longitudinally extending approximately wavy shape to form crests of waves interconnected by inclined portions of the material, said portions defining the legs of embryo fastener elements and the crests lying on one side of the said longitudinal axis of the material defining the ends of contiguous legs, enlarging at least the crests of the waves lying on the other side of said axis in at least one of their dimensions, providing said crests with coupling elements, and severing the material substantially at the centers of the crests defining the ends of the legs.

5. A method of making fastener elements for slide clasp fasteners comprising the steps of pressing a continuous blank material extending linearly along a longitudinal axis, into a continuous longitudinally extending approximately wavy shape to form crests of waves interconnected by inclined portions of the material, said portions defining the legs of embryo fastener elements and the crests lying on one side of the said longitudinal axis of the material defining the ends of contiguous legs, enlarging at least the cross-sectional area parallel to the surface of the waves of at least the crests lying on the other side of said axis, providing said crests with coupling elements, and severing the material substantially at the centers of the crests defining the ends of the legs.

6. A method of making fastener elements for slide clasp fasteners comprising the steps of pressing a continuous blank material extending linearly along a longitudinal axis, into a continuous longitudinally extending approximately wavy shape to form crests of waves interconnected by inclined portions of the material, said portions defining the legs of embryo fastener elements and the crests lying on one side of the said longitudinal axis of the material defining the ends of contiguous legs, enlarging at least the cross-sectional area parallel to the surface of the waves of at least the crests lying on the other side of said axis, providing said crests with coupling elements while they are embraced at least at their outer surface to prevent any substantial deformation of the outer contour thereof and to position accurately the coupling elements on said crests, and severing the material substantially at the centers of the waves defining the ends of the legs.

HERMANN RICHARD FRUENGEL.

REFERENCES CITED

The following references are of record in the file of this patent:

UNITED STATES PATENTS

| Number | Name | Date |
| --- | --- | --- |
| 2,266,593 | Emmons | Dec. 16, 1941 |
| 2,333,046 | Sabol | Oct. 26, 1943 |
| Re. 20,096 | Dibner | Sept. 8, 1936 |
| 2,106,129 | Sundback | Jan. 18, 1938 |
| 1,983,070 | Cox | Dec. 4, 1934 |
| 2,071,603 | Winterhalter | Feb. 23, 1937 |
| 2,106,012 | Nodine | Jan. 18, 1938 |
| 2,263,920 | Dau | Nov. 25, 1941 |
| 1,731,667 | Johnson | Oct. 15, 1929 |
| 2,158,078 | Miller | May 16, 1939 |
| 2,314,902 | Shepard | Mar. 30, 1943 |